United States Patent [19]
Sato

[11] Patent Number: 6,111,623
[45] Date of Patent: Aug. 29, 2000

[54] ACTIVE MATRIX SUBSTRATE

[75] Inventor: Takashi Sato, Tenri, Japan

[73] Assignee: Sharp Kabushiki Kaisha, Osaka, Japan

[21] Appl. No.: 09/136,575

[22] Filed: Aug. 19, 1998

[30] Foreign Application Priority Data

Aug. 21, 1997 [JP] Japan ................................. 9-225404

[51] Int. Cl.⁷ .................................................. G02F 1/1325
[52] U.S. Cl. .................................................. 349/106
[58] Field of Search .................................. 349/106

[56] References Cited

U.S. PATENT DOCUMENTS 5,705,302  1/1998  Ohno et al. .......................... 349/106

FOREIGN PATENT DOCUMENTS 8-313726  11/1996  Japan .

*Primary Examiner*—William L. Sikes
*Assistant Examiner*—James Dudek
*Attorney, Agent, or Firm*—Dike, Bronstein, Robert & Cushman, LLP; David G. Conlin

[57] ABSTRACT

An active matrix substrate of the present invention includes active elements;
  lines for supplying a signal to the active elements;
  electrodes electrically connected to the active elements; and
  a color filter made of a plurality of colored layers, which are provided on an insulating substrate,
  wherein the colored layers are formed in such a manner that a specific resistance ρ thereof and a resistance $R_{den}$ of a coloring solution for forming the color filter while the colored layers are electrochemically formed per pixel between a counter electrode and the active matrix substrate satisfy the following expression.

$$g_l(t_s)/g_s(t_s) \geq D_{lCF}/D_{CF}$$

$$D_{CF} = g_s(t_s) = k \times \int_0^{t_s} V/\{g_s(t)\rho \times 10^{-4}/S + R_{on}(s) + R_{den}\}dt$$

$$g_l(t_s) = k \times \int_0^{t_s} V/\{g_l(t)\rho \times 10^{-4}/S + R_{on}(l) + R_{den}\}dt$$

6 Claims, 10 Drawing Sheets

CIE chromaticity coordinate

ACTIVE MATRIX SUBSTRATE

BACKGROUND OF THE INVENTION

1. Field of the Invention

The present invention relates to an active matrix substrate which is disposed opposing a counter substrate with a liquid crystal layer interposed therebetween. More specifically, the present invention relates to an active matrix substrate in which transparent electrodes are arranged on a transparent base substrate, and a color filter having colored layers of red, green, and blue is formed on the transparent electrodes.

2. Description of the Related Art

A color liquid crystal display apparatus has been used as a display of, for example, a liquid crystal TV, a laptop personal computer, a note type personal computer, etc. As such a color liquid crystal display apparatus, those including a counter substrate on which a color filter is formed, an active matrix substrate on which active elements and pixel electrodes for driving a liquid crystal layer are formed, and a liquid crystal layer sealed between the substrates with a sealant are known.

The counter substrate is composed of an insulating base substrate and a color filter made of colored layers disposed at a distance on the insulating substrate. More specifically, the counter substrate includes a colored layer for each of three primary colors (red, green, and blue; hereinafter, referred to as "RGB"), and a black matrix which is disposed between the colored layers. The black matrix has a function of preventing a decrease in the contrast due to light leakage and a decrease in the display quality such as color purity. The surface of the glass substrate is smoothed with a topcoat material, and a transparent electrode is provided on the topcoat material. On the other hand, the active matrix substrate includes a glass substrate and active elements such as transparent electrodes (pixel electrodes) driving a liquid crystal layer and thin film transistors (TFTs) provided on the glass substrate.

The following five methods are generally known as a method for forming the colored layers of a color filter.

The first method is a printing method including the step of printing ink of the three primary colors, RGB, onto a glass substrate by using a printing machine.

The second method is a dispersion method which repeats the steps of coating a UV-curable resist with a pigment dispersed therein onto a glass substrate, exposing the substrate to light through a mask, and thermosetting the substrate three times with respect to RGB, thereby forming color layers.

The third method is a dyeing method including the steps of forming a resist as a dyeing preventing film on gelatin by photolithography, and dyeing the gelatin in each color of RGB with a dye.

The fourth method is an electrodeposition process including the steps of dispersing an electro-deposited polymer and a pigment, followed by performing electrodeposition coating by using electrodes formed on a substrate.

The fifth method is a micelle electrolytic process including the steps of dispersing a surfactant and a pigment, followed by electrolysis by using electrodes formed on a substrate.

In a color liquid crystal display apparatus provided with a color filter produced by the above-mentioned method, an active matrix substrate is attached to a counter substrate as described above. When the substrates are attached to each other, positioning with high precision is required so as to allow active elements on the active matrix substrate to correspond to a color filter on the counter substrate (attachment margin). Furthermore, in order to consider the attachment margin in accordance with precision for positioning and to prevent a decrease in a production efficiency caused by unsatisfactory attachment, it is required to design the black matrix so as to have a larger size. Enlargement in the size of the black matrix is one of the reasons for the decrease in the opening ratio.

In order to solve these problems, a method for forming a color filter on driving electrodes on an active matrix substrate by an electrochemical procedure has been proposed (Japanese Laid-open Publication No. 8-313726).

According to the above-mentioned proposed method, the thickness of a colored layer of each pixel is determined by the value of the current flowing through the pixel. In the presence of a supporting electrolyte which minimizes a voltage drop due to an electrolytic solution, a variation in the thickness occurs in the colored layers to be formed by a variation in the ON resistance of active elements (i.e., the resistance of the active elements when the gates are on). This variation in the thickness makes it difficult to obtain satisfactory display quality.

Furthermore, according to the above-mentioned proposed method, in the case where a color filter is provided with conductivity so as to be used as a driving electrode, a variation in the ON resistance is caused in the active elements when the resistance of an electrolytic solution is low. This causes a variation in the film thickness of the colored layers, making it difficult to obtain sufficient display quality.

SUMMARY OF THE INVENTION

An active matrix substrate of the present invention, includes active elements; lines for supplying a signal to the active elements; electrodes electrically connected to the active elements; and a color filter made of a plurality of colored layers, which are provided on an insulating substrate, wherein the colored layers are formed in such a manner that a specific resistance ρ thereof and a resistance $R_{den}$ of a coloring solution while the colored layers are electrochemically formed per pixel between a counter electrode for forming the color filter and the active matrix substrate satisfy the following expression:

$$g_l(t_s)/g_s(t_s) \geq D_{lCF}/D_{CF}$$

where $D_{lCF}$ represents an allowable lower limit value (μm) of a thickness of the color filter, $g_s(t_s)$ and $D_{CF}$ represent $$D_{CF} = g_s(t_s) = k \times \int_0^{t_s} V / \{g_s(t)\rho \times 10^{-4} / S + R_{on}(s) + R_{den}\} dt$$

where
- $D_{CF}$: designed thickness (μm) of a color filter,
- $R_{on}(s)$: designed value (Ω) of the ON resistance of an active element
- $t_s$: time (seconds) for which a color filter with a thickness $D_{CF}$ is formed on a pixel electrode connected to an active element with a designed value $R_{on}(s)$
- V: DC power source (volts)
- $g_s(t)$: thickness (μm) of a color filter formed on a pixel electrode connected to an active element with a designed value $R_{on}(s)$ after t seconds
- k: proportionality factor (ms$^{-1}$A$^{-1}$) of electrodeposition (thickness of a color filter becomes g μm when the color filter is electro-deposited for T seconds at a constant current a $\mu$A)

$\rho$: specific resistance ($\Omega \cdot$cm) of a color filter formed by electrodeposition S: area (cm$^2$) of a pixel electrode $R_{den}$: resistance ($\Omega$) of a coloring solution per pixel between a counter electrode for forming a color filter and an active matrix substrate, and $g_l(t_s)$ represents $$g_l(t_s) = k \times \int_0^{t_s} V / \{g_l(t)\rho \times 10^{-4}/S + R_{on}(l) + R_{den}\} dt$$

where $R_{on}(l)$: allowable limit value ($\Omega$) of a variation in the ON resistance of active elements $g_l(t)$: thickness ($\mu$m) of a color filter formed on a pixel electrode connected to an active element having an ON resistance with an allowable limit value of a variation $R_{on}(l)$, and the rest of the values are as defined above.

In one embodiment of the present invention, the electrodes electrically connected to the active elements are made of pixel electrodes and transparent electrodes for driving a liquid crystal layer, and the transparent electrodes for driving a liquid crystal layer are used for driving a liquid crystal layer.

In another embodiment of the present invention, the electrodes electrically connected to the active elements are made of pixel electrodes, and the pixel electrodes and the color filter both have conductive characteristics and are used for driving a liquid crystal layer.

According to another aspect of the present invention, a method for producing an active matrix substrate of the present invention, includes the step of forming a color filter made of a plurality of colored layers on an insulating substrate having active elements, lines for supplying a signal to the active elements, and electrodes electrically connected to the active elements, wherein the colored layers are formed in such a manner that a specific resistance $\rho$ thereof and a resistance $R_{den}$ of a coloring solution while the colored layers are electrochemically formed per pixel between a counter electrode for forming the color filter and the active matrix substrate satisfy the following expression:

$$g_l(t_s)/g_s(t_s) \geq D_{lCF}/D_{CF}$$

where $D_{lCF}$ represents an allowable lower limit value ($\mu$m) of the thickness of the color filter, $g_s(t_s)$ and $D_{CF}$ represent $$D_{CF} = g_s(t_s) = k \times \int_0^{t_s} V / \{g_s(t)\rho \times 10^{-4}/S + R_{on}(s) + R_{den}\} dt$$

where $D_{CF}$: designed thickness ($\mu$m) of a color filter, $R_{on}(s)$: designed value ($\Omega$) of the ON resistance of an active element $t_s$: time (seconds) for which a color filter with a thickness $D_{CF}$ is formed on a pixel electrode connected to an active element with a designed value $R_{on}(s)$ V: DC power source (volts) $g_s(t)$: thickness ($\mu$m) of a color filter formed on a pixel electrode connected to an active element with a designed value $R_{on}(s)$ after t seconds k: proportionality factor (ms$^{-1}$A$^{-1}$) of elecrodeposition (thickness of a color filter becomes g $\mu$m when the color filter is electro-deposited for T seconds at a constant current a $\mu$A)

$\rho$: specific resistance ($\Omega \cdot$cm) of a color filter formed by electrodeposition S: area (cm$^2$) of a pixel electrode $R_{den}$: resistance ($\Omega$) of a coloring solution per pixel between a counter electrode for forming a color filter and an active matrix substrate, and $g_l(t_s)$ represents $$g_l(t_s) = k \times \int_0^{t_s} V / \{g_l(t)\rho \times 10^{-4}/S + R_{on}(l) + R_{den}\} dt$$

where $R_{on}(l)$: allowable limit value ($\Omega$) of a variation in the ON resistance of active elements $g_l(t)$: thickness ($\mu$m) of a color filter formed on a pixel electrode connected to an active element having an ON resistance with an allowable limit value of a variation $R_{on}(l)$, and the rest of the values are as defined above.

In one embodiment of the present invention, the electrodes electrically connected to the active elements are made of pixel electrodes and transparent electrodes for driving a liquid crystal layer, and the transparent electrodes for driving a liquid crystal layer are used for driving a liquid crystal layer.

In another embodiment of the present invention, the electrodes electrically connected to the active elements are made of pixel electrodes, and the pixel electrodes and the color filter both have conductive characteristics and are used for driving a liquid crystal layer.

Hereinafter, the function of the present invention will be described.

Depending upon the specifications of a color liquid crystal display apparatus, the range of the specific resistance required of a color filter and the resistance of an electrolytic solution are varied. The relationship between the range of the specific resistance of a color filter and the resistance of a coloring solution and the specifications of a liquid crystal display apparatus, which enables a thickness distribution of a color filter formed on an active matrix substrate to be within an allowable range, are shown below.

In the case where a color filter with a designed thickness $D_{CF}$ is formed on a pixel electrode connected to an active element which has a designed value of an ON resistance $R_{on}(s)$, the relationship between the time $t_s$ and the thickness $D_{CF}$ satisfies the following Expression (1):

$$D_{CF} = \qquad (1)$$

$$g_s(t_s) = k \times \int_0^{t_s} V / \{g_s(t)\rho \times 10^{-4}/S + R_{on}(s) + R_{den}\} dt$$

where $D_{CF}$: designed thickness ($\mu$m) of a color filter, $R_{on}(s)$: designed value ($\Omega$) of the ON resistance of an active element $t_s$: time (seconds) for which a color filter with a thickness $D_{CF}$ is formed on a pixel electrode connected to an active element with a designed value $R_{on}(s)$ V: DC power source (volts)

$g_s(t)$: thickness ($\mu$m) of a color filter formed on a pixel electrode connected to an active element with a designed value $R_{on}(s)$ after t seconds k: proportionality factor (ms$^{-1}$A$^{-1}$) of electrodeposition (thickness of a color filter becomes g μm when the color filter is electro-deposited for T seconds at a constant current a μA)

ρ: specific resistance (Ω·cm) of a color filter formed by electrodeposition

S: area (cm$^2$) of a pixel electrode $R_{den}$: resistance (Ω) of a coloring solution per pixel between a counter electrode for forming a color filter and an active matrix substrate.

Furthermore, a thickness $g_l(t_s)$ of a color filter formed on a pixel electrode connected to an active element having an ON resistance within an allowable limit value of a variation $R_{on}(l)$ is represented by the following Expression (2):

$$g_l(t_s) = k \times \int_0^{T_s} V / \{g_l(t) \rho \times 10^{-4} / S + R_{on}(l) + R_{den}\} dt \quad (2)$$

where $R_{on}(l)$: allowable limit value (Ω) of a variation in the ON resistance of active elements $g_l(t)$: thickness (μm) of a color filter formed on a pixel electrode connected to an active element having an ON resistance with an allowable limit value of a variation $R_{on}(l)$, and the rest of the values are as defined above.

The active matrix substrate of the present invention is provided with active elements and a color filter. Thus, when the active matrix substrate is attached to a counter substrate, positioning with high precision is not required for allowing the active elements on the active matrix substrate to correspond to the color filter on the counter substrate. Furthermore, an attachment margin is not required to be obtained in accordance with the positioning precision, and a black matrix is not required to have a large size, in order to avoid a decrease in the production efficiency due to unsatisfactory attachment of the active matrix substrate and the counter substrate, Therefore, the opening ratio can be increased, resulting in a brighter display.

Furthermore, in the active matrix substrate of the present invention, the ratio of the physical properties $g_l(t_s)$ and $g_s(t_s)$ when the above-mentioned color filter is formed satisfies the following Expression (3) in view of a designed thickness of a color filter and its allowable range:

$$g_l(t_s)/g_s(t_s) \geq D_{lCF}/D_{CF} \quad (3)$$

where $D_{lCF}$: allowable lower limit value of a variation in the thickness of a color filter.

As described above, by stipulating the relationship between $g_l(t_s)$ and $g_s(t_s)$, even when there is a variation in the ON resistance of each active element, the thicknesses of colored layers forming a color filter can be made uniform without any variation among each active element. Thus, an active matrix substrate of high display quality with a color filter can be provided.

More specifically, a specific resistance ρ of an appropriate color filter (colored layers) and a resistance $R_{den}$ of an electrolytic solution (coloring solution) can be obtained from the above-mentioned Expression (3) in accordance with S, $R_{on}(s)$, and $R_{on}(l)$.

For example, in the case of a 6-inch diagonal VGA liquid crystal display apparatus wherein transparent electrodes are used for driving a liquid crystal layer, the specific resistance of a colored layer should be about 2.2×10$^7$ Ω·cm or more. Alternatively, even when the specific resistance of a colored layer is less than about 2.2×10$^7$ Ω·cm, if the resistance of a coloring solution when colored layers are electrochemically formed per pixel between the counter electrode for forming a color filter and the active matrix substrate is about 2.8×10$^7$ Ω or more, the same functional effect can be obtained. Under this condition, a color filter of high display quality with a uniform thickness can be produced, even in a liquid crystal display apparatus with a relatively large variation (this is negligible in driving a liquid crystal layer) in the ON resistance of active elements.

In the case of a 12-inch diagonal XGA liquid crystal display apparatus wherein transparent electrodes are used for driving a liquid crystal layer, the specific resistance of a colored layer should be about 3.5×10$^7$ Ω·cm or more. Alternatively, even when the specific resistance of a colored layer is less than about 3.5×10$^7$ Ω·cm, if the resistance of a coloring solution when colored layers are electrochemically formed per pixel between the counter electrode for forming a color filter and the active matrix substrate is about 2.4×10$^7$ Ω or more, the same functional effect can be obtained. Under this condition, a color filter of high display quality with a uniform thickness can be produced, even in a liquid crystal display apparatus with a relatively small variation (this is negligible in driving a liquid crystal layer) in the ON resistance of active elements.

Alternatively, in the case of a 6-inch diagonal VGA liquid crystal display apparatus wherein pixel electrodes and the color filter having conductive characteristics are used for driving a liquid crystal layer, the specific resistance of a colored layer should be about 1.2×10$^7$ Ω·cm or less and the resistance of a coloring solution when colored layers are electrochemically formed per pixel between the counter electrode for forming a color filter and the active matrix substrate should be about 2.8×10$^7$ Ω or more. Under this condition, electrodes for driving a liquid crystal layer are not required to be formed on the colored layers, and a color filter of high display quality with a uniform thickness can be produced, even when there is a variation (this is negligible in driving a liquid crystal layer) in the ON resistance of active elements.

In the case of a 12-inch diagonal XGA liquid crystal display apparatus wherein pixel electrodes and the color filter having conductive characteristics are used for driving a liquid crystal layer, the specific resistance of a colored layer should be about 1.2×10$^6$ Ω·cm or less and the resistance of a coloring solution when colored layers are electrochemically formed per pixel between the counter electrode for forming a color filter and the active matrix substrate should be about 2.4×10$^7$ Ω or more. Under this condition, electrodes for driving a liquid crystal layer are not required to be formed on the colored layers, and a color filter of high display quality with a uniform thickness can be produced, even when there is a variation (this is negligible in driving a liquid crystal layer) in the ON resistance of active elements.

Thus, the invention described herein makes possible the advantage of providing an active matrix substrate provided with a color filter, which is capable of obtaining high display quality irrespective of the presence of a variation in the ON resistance of active elements.

This and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described in detail by way of illustrative embodiments. It should be noted that the present invention is not limited thereto.

Embodiment 1

Hereinafter, an active matrix substrate used in an active matrix liquid crystal display apparatus which is one embodiment of the present invention will be described with reference to the drawings.

Figure 1:
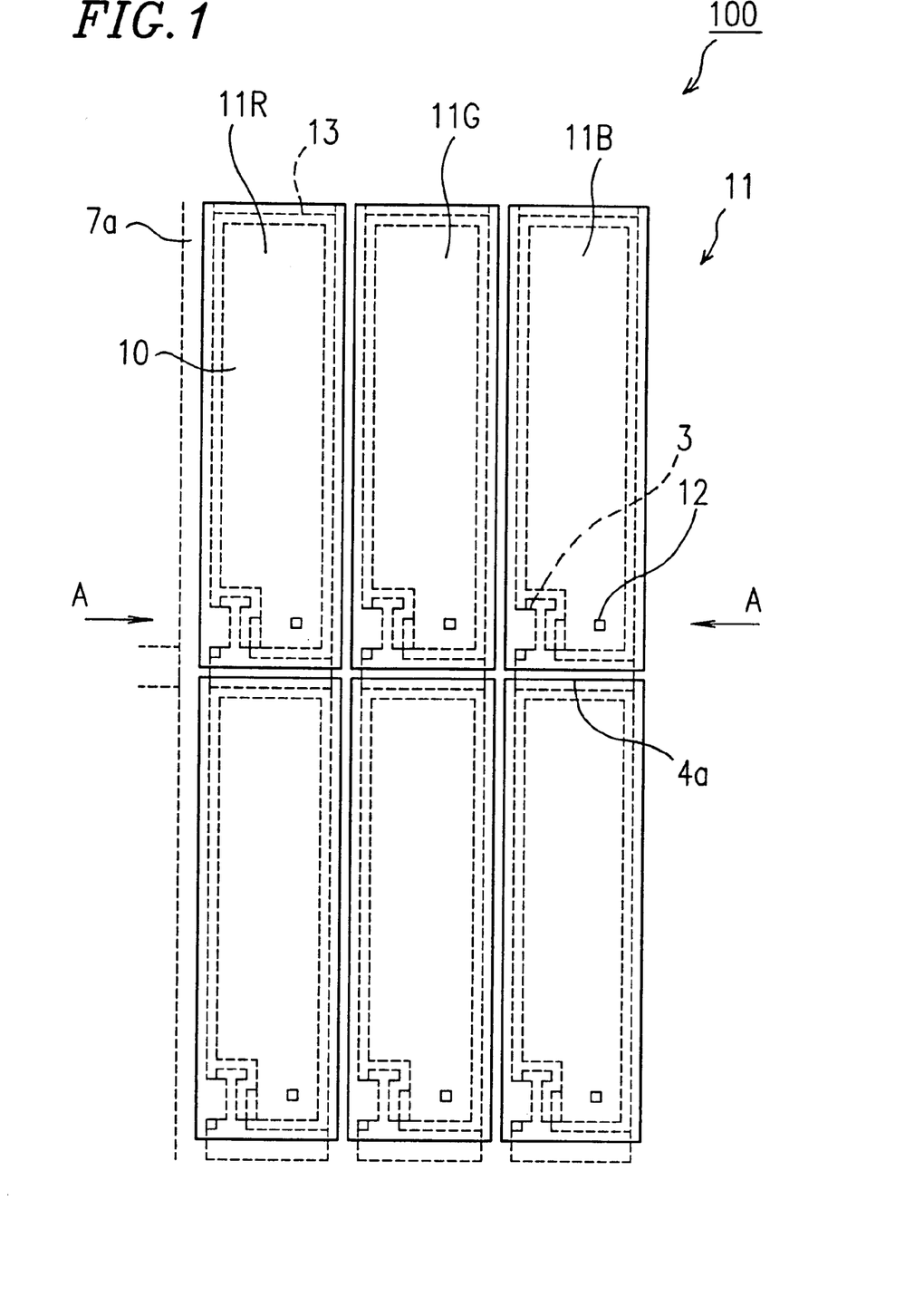
FIG. 1 is a plan view showing an active matrix substrate according to Embodiment 1 of the present invention.

First, a structure of an active matrix liquid crystal display apparatus will be described with reference to FIGS. 1 and 2. FIG. 1 is a plan view of a portion of an active matrix liquid crystal display apparatus 100 using thin film transistors (TFTs) as active elements, and FIG. 2 is a cross-sectional view taken along a line A—A in FIG. 1.

The liquid crystal display apparatus 100 includes a first substrate a produced by a production method described later, a second substrate b which is attached to the first substrate a with a frame-shaped sealant (not shown), and a liquid crystal layer 16 sealed between the substrates a and b. The first substrate a is an active matrix substrate, and the second substrate b is a counter substrate.

Figure 2:
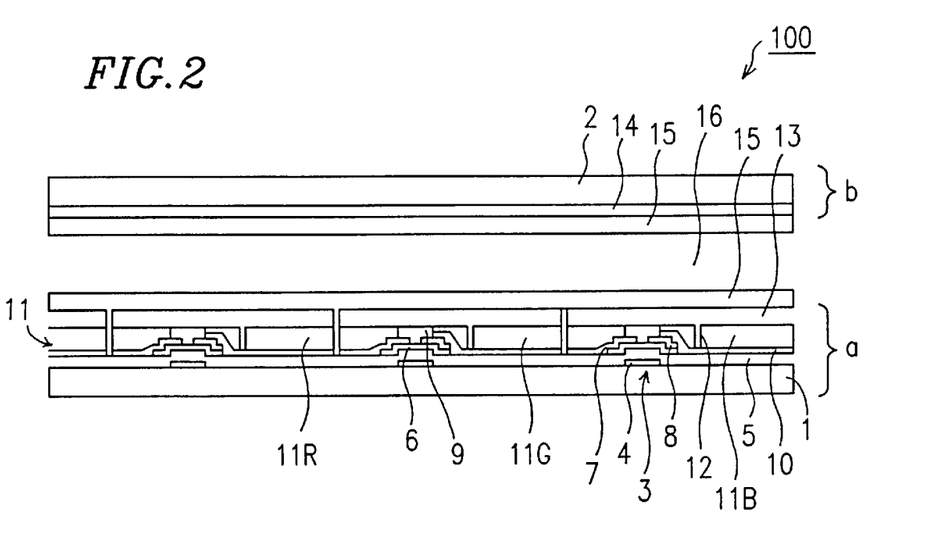
FIG. 2 is a cross-sectional view taken along a line A—A in FIG. 1.

As shown in FIGS. 1 and 2, the first substrate a includes a transparent base substrate 1 made of glass or the like, a plurality of pixel electrodes (transparent electrodes for forming a color filter) 10 and TFTs 3 which are active elements for driving the pixel electrodes 10, arranged in a matrix on the base substrate 1, and a color filter 11 made of colored layers 11R, 11G, and 11B of red, green, and blue corresponding to each pixel electrode 10.

The TFTs 3 have an inverted staggered structure. Each TFT 3 includes a gate electrode 4 formed on the base substrate 1, a transparent gate insulating film 5 made of silicon nitride (SiNx) or the like formed over the entire surface of the base substrate 1 on the gate electrode 4, a semiconductor layer 6 made of amorphous silicon (a-Si) or the like formed on the gate insulating layer 6, and a source electrode 7 and a drain electrode 13 formed on the semiconductor layer 6.

The gate electrode 4 of the TFT 3 is connected to a scanning line 4a formed on the base substrate 1. The source electrode 7 of the TFT 3 is connected to a data line 7a formed so as to cross (in FIG. 1, be orthogonal to) the scanning line 4a on the gate insulating film 5. The data line 7a is covered with a protecting insulating film 9 made of silicon nitride or the like over its total length excluding its terminal portions. The TFT 3 is also covered with the protecting insulating film 9 over the entire surface excluding a pixel electrode connecting terminal of the drain electrode 8.

The pixel electrode 10 is formed on the gate insulating film 5 so as to partially overlay the end of the drain electrode 8, thereby being connected to the drain electrode 8.

The color filter 11 made of colored layers 11R, 11G, and 11B of red, green, and blue are arranged in a column direction so as to correspond to each pixel electrode 10 arranged in a matrix. The colored layers 11R, 11G, and 11B of each color are designed so as to have the same shape as that of each pixel electrode 10, and are formed over an entire surface of each pixel electrode 10 excluding a contact hole 12 provided so that each drain electrode 8 is electrically connected to a transparent electrode 13 for driving a liquid crystal layer. Each transparent electrode 13 for driving a liquid crystal layer functions as an electrode for substantially driving the liquid crystal layer 16 in the present embodiment, and each pixel electrode 10 functions as an electrode for forming a color filter. Furthermore, each transparent electrode 13 for driving the liquid crystal layer 16 is made of ITO (indium tin oxide), and is electrically connected to the drain electrode 8 through the contact hole 12 in the color filter 11 formed above the drain electrode 8.

On the other hand, the second substrate b includes a transparent base substrate 2 made of glass or the like, and a counter electrode (transparent electrode) 14 formed on the base substrate 1 so as to oppose each pixel electrode 10 on the base substrate 1. The counter electrode 14 is one electrode formed over almost the entire surface of the second substrate b.

In FIG. 2, alignment films 15 are formed on the first substrate a and the second substrate b, respectively.

Figure 3A:
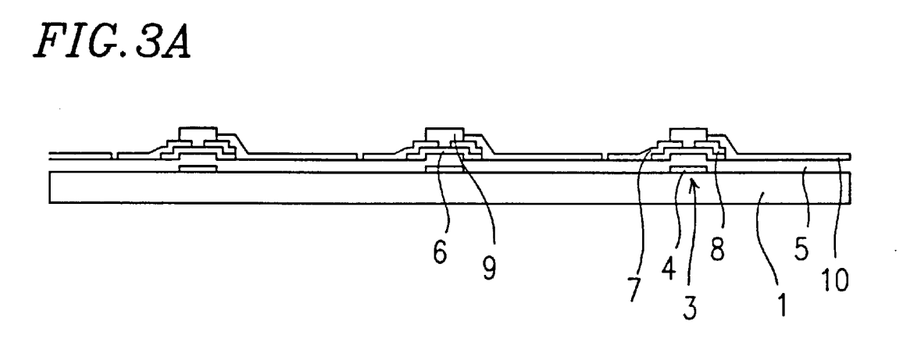
FIGS. 3A through 3C are cross-sectional views illustrating process steps of producing the active matrix substrate according to Embodiment 1 of the present invention.
Figure 3B:
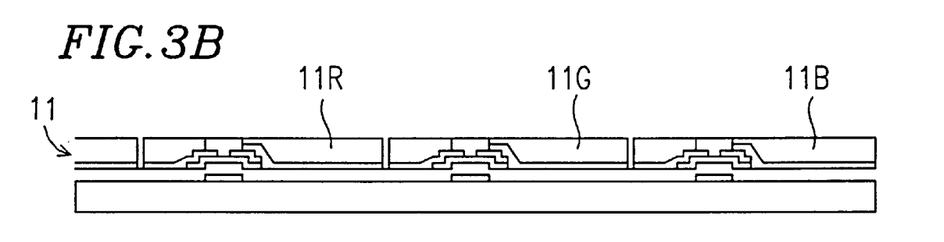
Figure 3C:
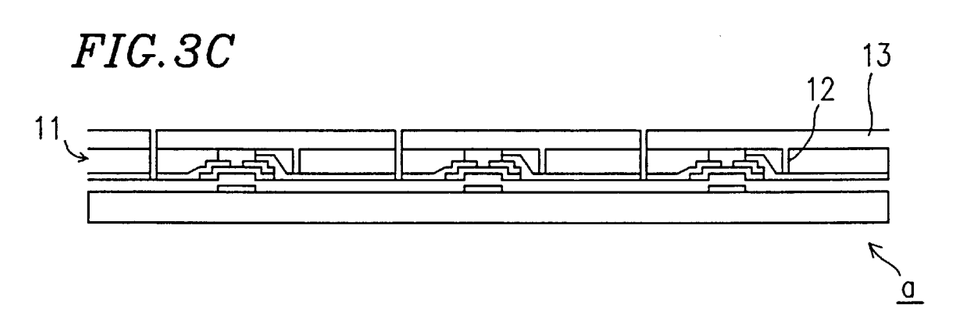

Next, a method for producing the active matrix substrate with the above-mentioned structure will be described with reference to FIGS. 3A to 3C. FIGS. 3A through 3C show the steps of producing the first substrate a. The first substrate a is produced by the following steps.

First, as shown in FIG. 3A, the TFTs 3, the scanning lines 4, the gate insulating film 5, and the data lines 7 are formed on the base substrate 1 by a known production method. The protecting insulating films 9 are formed on the TFTs 3 and the data lines 7 by photolithography, and the pixel electrodes 10 are formed on the gate insulating film 5.

Next, referring to FIG. 3B, a method for forming a red colored layer 11R by electro-depositing a red filter material on each pixel electrode 10 arranged in a column direction will be described.

In this case, examples of a resin material (i.e., a binder) for the filter material include maleic oil resins, acrylic resins, polyester resins, polybutadiene resins, and polyolefin resins. These materials can be used alone or in combination thereof. A coloring matter having a desired hue such as a dye and a pigment is mixed with a binder. In general, an electrodeposition solution (i.e., a coloring solution) can be prepared by dispersing, dissolving, and diluting components such as a binder and a coloring matter in water. As a solvent for an electrodeposition solution, an organic solvent can be used in place of water.

The first substrate a obtained in the above-mentioned steps is placed in a bath containing an electrodeposition solution prepared as described above. In the case of an anion electrodeposition coating method, the pixel electrodes 10 on the first substrate 1 become positive electrodes. A corrosion proof conductive material (e.g., stainless steel, etc.) is placed in the solution as a counter electrode, and a DC voltage is applied across the pixel electrodes 10 and the counter electrode. Then, a film is selectively electro-deposited onto the pixel electrodes 10. Here, a voltage is applied to each pixel electrode 10 as follows: a scanning signal (a gate voltage which turns on the TFTs 3) is successively applied to each scanning line 4, and in synchronization with this, a voltage for inducing electrodeposition is applied to the data lines 7 corresponding to predetermined pixel electrodes 10 on which the red colored layer 11R is to be electro-deposited. Thus, a voltage is applied from the data lines 7 only to the predetermined pixel electrodes 10 on which the red colored layer 11R is to be electro-deposited, among the pixel electrodes 10 along the selected scanning line 4, and a filter material in the solution adheres to the entire surfaces of the predetermined pixel electrodes 10 to which a voltage has been applied.

Since the data lines 7 and portions of the TFTs 3 other than the pixel electrode connecting portions thereof are covered with the protecting insulating films 9, the filter material does not adhere to the data lines 7 and the TFTs 3 during the above-mentioned electrodeposition step.

In the similar way, each colored layer 11B and 11G of blue and green is formed on predetermined pixel electrodes 10.

Next, as shown in FIG. 3C, contact holes 12 are formed in the color filter (colored layers) 11 on the drain electrodes 8 by photolithography. Then, the transparent electrodes 13 for driving a liquid crystal layer are formed by sputtering so as to cover the entire surface of the first substrate a, and subjected to photolithography so as to have a shape as shown in FIG. 1.

As shown in FIG. 2, the second substrate b is obtained by forming the counter electrode 14 made of ITO corresponding to the transparent electrodes 13 for driving a liquid crystal layer on the first substrate 1 on the transparent substrate made of glass or the like by sputtering. The counter electrode 14 is one electrode formed over almost the entire surface of the second substrate b. In FIG. 2, the alignment films 15 are formed on the first substrate a and the second substrate b by an offset printing method, and subjected to a rubbing treatment for uniformly aligning liquid crystal molecules.

In the present embodiment, the color filter is formed by electrodeposition. However, the present invention is not limited thereto. Any electrochemical method can be used.

Specific Resistance of the Color Filter

The color filter in the present embodiment is formed by electrodeposition. Therefore, if there is a variation in the value of the current flowing through each pixel electrode, a variation in the thickness of the color filter (colored layers) to be formed occurs. This makes it impossible to produce a liquid crystal display apparatus of high display quality.

A variation in the value of a current flowing through each pixel electrode is determined by a variation in the resistance (ON resistance) when active elements are on in the case of active driving. In the case where a liquid crystal layer is driven, if an ON resistance is lower than a resistance at which a sufficient effective voltage can be applied to the liquid crystal layer, the ON resistance is negligible as far as the liquid crystal display quality is concerned. Thus, in order to make the thickness of the color filter uniform, it is desirable that the specific resistance of the color filter is to be prescribed as large as possible so as to avoid the influence of a variation in the ON resistance. However, an ON resistance should be within a range which does not cause any problem in view of liquid crystal display quality. Thus, the upper limit of the ON resistance is defined by a boundary value of the resistance at which a sufficient effective voltage can be applied to a liquid crystal layer.

Figure 4:
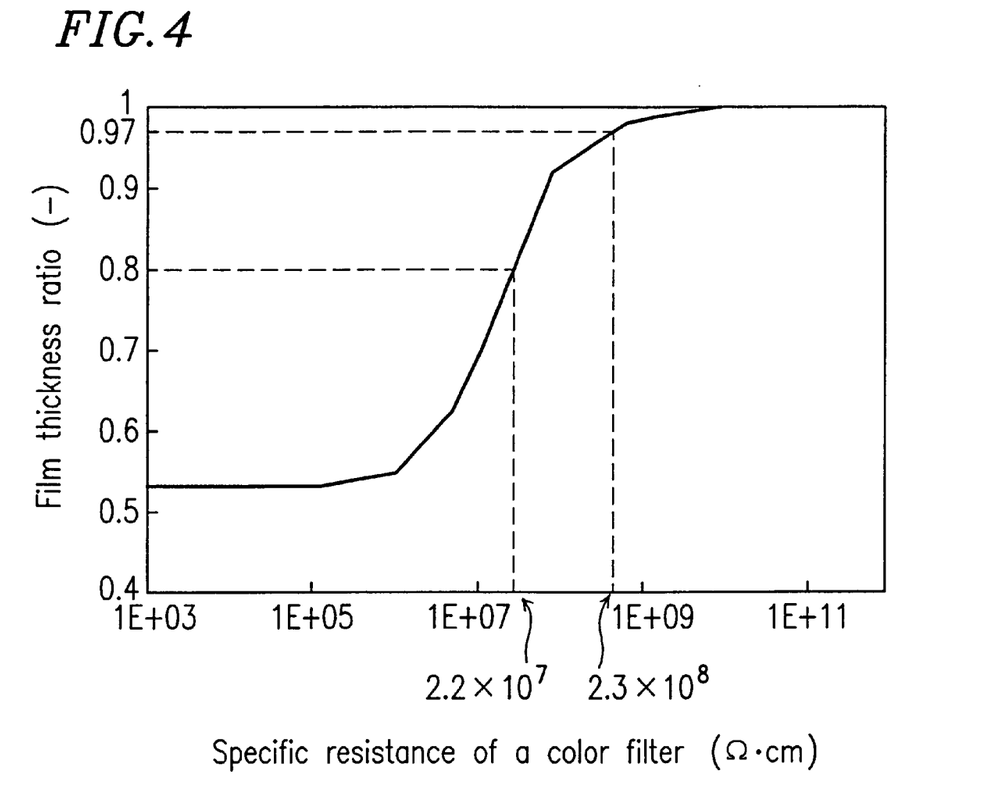
FIG. 4 is a graph showing the relationship between the specific resistance of a color filter and the film thickness ratio in an active matrix substrate used in a 6-inch diagonal VGA liquid crystal display apparatus.

As an example, the case where a color filter is formed on pixel electrodes by electrodeposition in an active matrix substrate used in a 15 cm (about 6 inches)-diagonal VGA liquid crystal display apparatus (e.g., 640×RGB×480 pixels; dot clock: about 25.2 MHz) will be described. FIG. 4 shows the relationship between the specific resistance of the color filter and the film thickness ratio. The values used for each parameter in the above-mentioned Expressions (1) to (3), which are used for obtaining the graph of FIG. 4, are shown in the following Table 1.

TABLE 1

Figure 5:
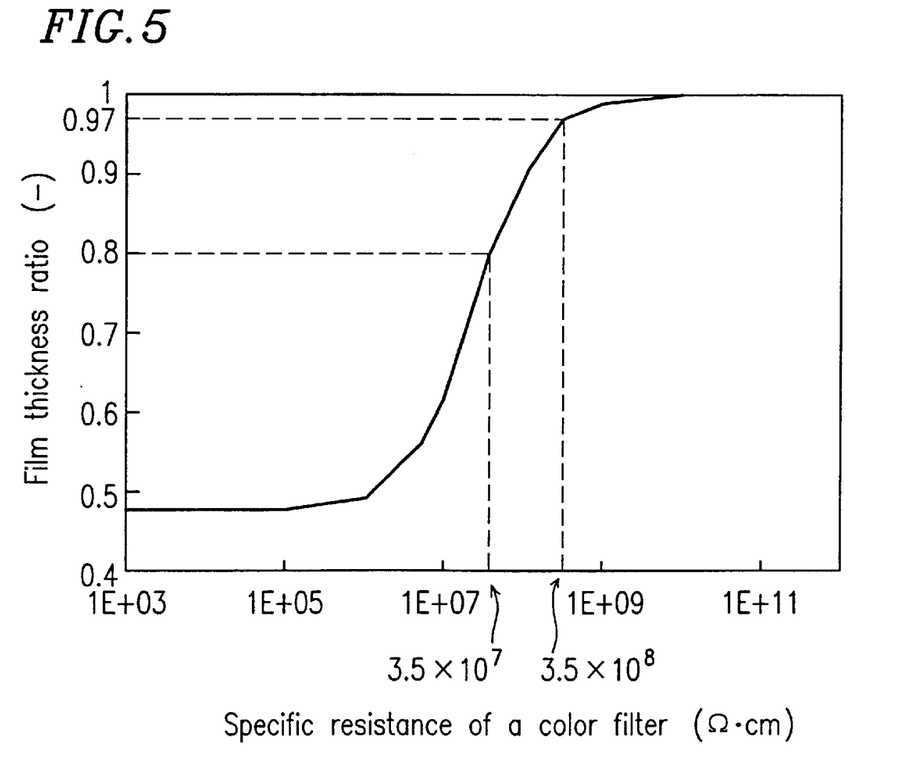
FIG. 5 is a graph showing the relationship between the specific resistance of a color filter and the film thickness ratio in an active matrix substrate used in a 12-inch diagonal XGA liquid crystal display apparatus.

|  | Figure 4 | Figure 5 |
| --- | --- | --- |
| $D_{CF}(\mu m)$ | 1.5 | 1.5 |
| $R_{on}(s)(\Omega)$ | $1.1 \times 10^7$ | $7.0 \times 10^6$ |
| $t_s(s)$ | values which change depending upon the specific resistance of a color filter | values which change depending upon the specific resistance of a color filter |
| V(V) | 10 | 10 |
| $k(ms^{-1}A^{-1})$ | 1.5 | 1.5 |
| $S(cm^2)$ | $1.21 \times 10^{-4}$ | $1.92 \times 10^{-4}$ |
| $R_{den}(\Omega)$ | 1000 | 1000 |
| $R_{on}(\lambda)(\Omega)$ | $2.07 \times 10^7$ | $1.48 \times 10^7$ |
| $D_{\lambda CF/DCF}(-)$ | 0.8 | 0.8 |

The film thickness ratio refers to a ratio between a thickness of a colored layer with sufficient color concentration formed on a pixel electrode connected to a TFT having a desired value in the ON resistance and a thickness of a colored layer formed on a pixel electrode connected to a TFT having an ON resistance at which a sufficient effective voltage is not applied. An ON resistance at which a sufficient effective voltage cannot be applied refers to a resistance which exceeds the upper limit of the ON resistance, and whose variation is sufficiently smaller when compared with the designed value. Based on these, the ON resistance at which a sufficient effective voltage cannot be applied can be evaluated. More specifically, as the film thickness ratio becomes larger (closer to 1), the thickness becomes uniform and display quality becomes high.

As shown in FIG. 4, when the specific resistance of the color filter is smaller than about $2.2 \times 10^7$ Ω·cm, the film thickness ratio becomes small, resulting in a decrease in the display quality of a liquid crystal display apparatus.

As described above, in order to produce a 6-inch diagonal VGA liquid crystal display apparatus of high display quality, the specific resistance of a color filter material is desirably about $2.2 \times 10^7$ Ω·cm or more.

However, as described in Embodiment 2, depending upon the kind of a liquid crystal display apparatus, a liquid crystal display apparatus of high display quality can be produced even when the specific resistance of a color filter is smaller than about 2.2×10⁷ Ω·cm.

Alternatively, FIG. 5 shows the relationship between the specific resistance of a color filter and the film thickness ratio, for example, in a case where a color filter is formed on pixel electrodes by electrodeposition in an active matrix substrate used in a 30 cm (about 12 inches)-diagonal XGA liquid crystal display apparatus (e.g., 1024×RGB×768 pixels; dot clock: about 65 MHz). The values used for each parameter in the above-mentioned Expressions (1) to (3), which are used for obtaining the graph in FIG. 5, are also shown in Table 1.

As show in FIG. 5, when the specific resistance of a color filter is smaller than 3.5×10⁷ Ω·cm, the film thickness ratio becomes small, resulting in a liquid crystal display apparatus of low display quality.

As described above, in order to produce a 12-inch diagonal XGA liquid crystal display apparatus of high display quality, the specific resistance of a color filter material is desirably about 3.5×10⁷ Ω·cm or more.

However, as described in Embodiment 2, depending upon the kind of a liquid crystal display apparatus, a liquid crystal display apparatus of high display quality can be produced even when the specific resistance of a color filter is smaller than about 3.5×10⁷ Ω·cm.

Figure 6:
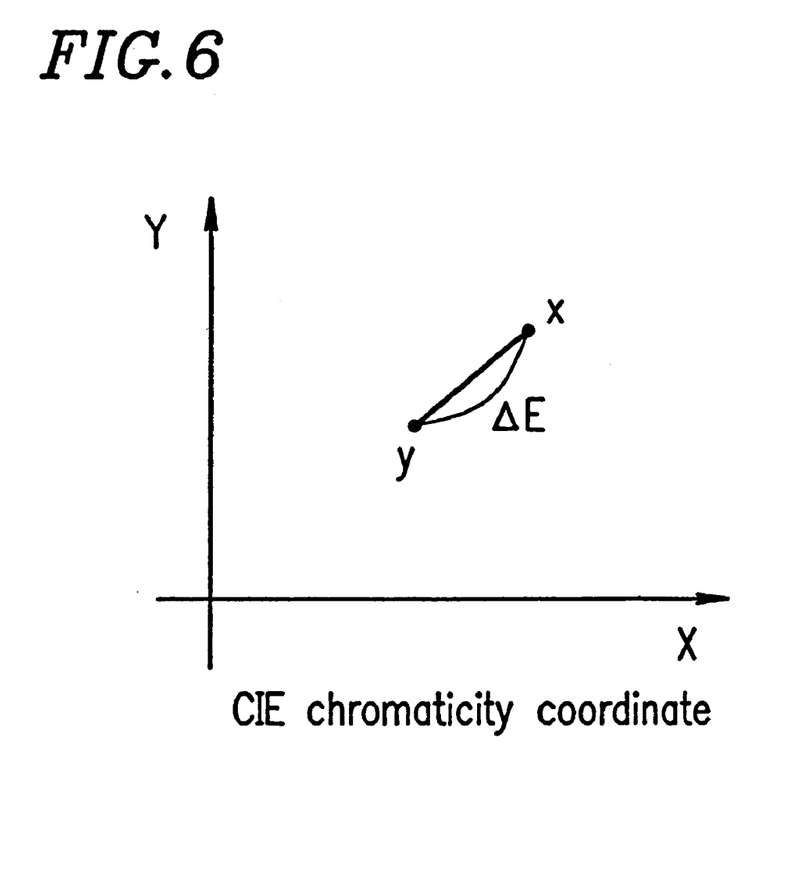
FIG. 6 is a graph illustrating a color difference used for determining a reference value of a film thickness ratio of a color filter.

A value of $D_{ICF}/D_{CF}$ among the parameters in Table 1 is prescribed to be about 0.8 for the following reason. Referring to FIG. 6, a color difference ΔE between two samples (color stimulus) defined by ΔL*, Δa*, and Δb* (which are differences of coordinates L*, a*, and b* in an L*a*b* color system) is represented by ΔE*ab.

$$\Delta E^* ab = [(\Delta L^*)^2 + (\Delta a^*)^2 + (\Delta b^*)^2]^{1/2}$$

$$L^* = 116\left(\frac{Y}{Y_n}\right)^{1/3} - 16$$

$$a^* = 500\left[\left(\frac{X}{X_n}\right)^{1/3} - \left(\frac{Y}{Y_n}\right)^{1/3}\right]$$

$$b^* = 200\left[\left(\frac{Y}{Y_n}\right)^{1/3} - \left(\frac{Z}{Z_n}\right)^{1/3}\right]$$

X, Y, and Z are tristimulus values in an XYZ color system of samples, and $X_n$, $Y_n$, and $Z_n$ tristimulus values of a complete diffusion reflecting surface. (In the case of transmission, $X_n$, $Y_n$, and $Z_n$ become tristimulus values of a light source color, and X, Y, and Z become tristimulus values after transmission through a color filter.) As shown in FIG. 6, a point x becomes indistinguishable from a point y in color on a CIE chromaticity coordinate, when the relationship of color difference (ΔE)≦5 is satisfied. This is converted into a film thickness ratio of an ordinary color filter, resulting in about 0.8 or more.

The film thickness ratio is more preferably about 0.97 or more. A first reason for this is that uniformity of a thickness of a liquid crystal cell can be obtained. A second reason for this is that uniformity of a thickness of an electrode for driving a liquid crystal layer can be obtained even in the case where a colored layer itself is used as an electrode for driving a liquid crystal layer as described in Embodiment 2 described later, (irrespective of whether or not a transparent electrode is formed on a colored layer and is used for driving a liquid crystal layer as in the present embodiment). A third reason for this is that coating properties of forming a planarization film and a polyimide film used to flatten a surface having unevenness caused by the TFTs 3, for example, can be improved.

In order to obtain the film thickness ratio of about 0.97 or more, the specific resistance should be about 2.3×10⁸ Ω·cm or more in FIG. 4 and about 3.5×10⁸ Ω·cm or more in FIG. 5.

Embodiment 2

Figure 7:
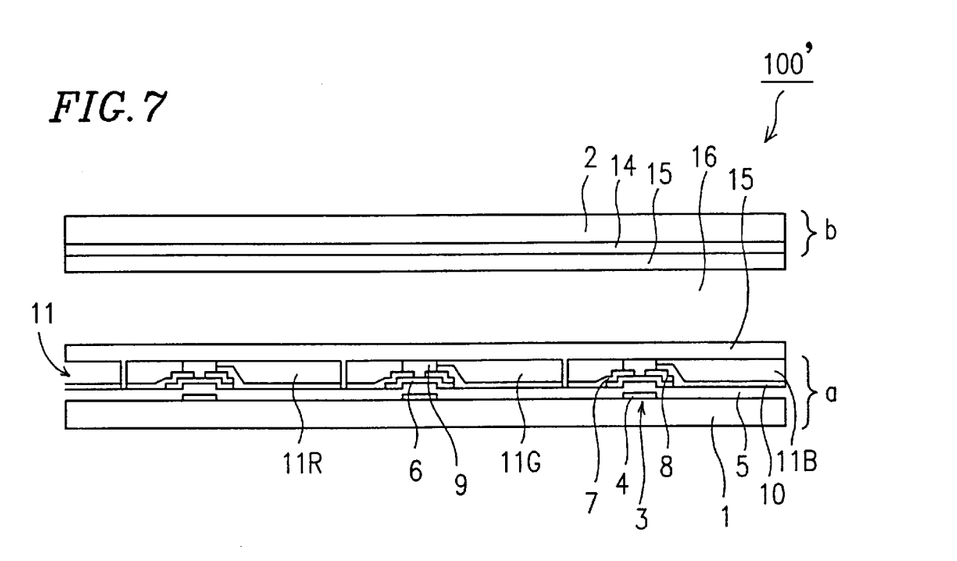
FIG. 7 is a cross-sectional view of an active matrix substrate according to Embodiment 2 of the present invention.

Hereinafter, an active matrix substrate used in an active matrix liquid crystal display apparatus which is another embodiment of the present invention will be described by way of Embodiment 2. A liquid crystal display apparatus 100' according to Embodiment 2 is different from that according to Embodiment 1 shown in FIG. 2 in that the transparent electrodes 13 for driving a liquid crystal layer are not present as shown in FIG. 7. Thus, a method for producing the liquid crystal display apparatus 100' shown in FIG. 7 is different from that for producing the liquid crystal display apparatus 100 shown in FIG. 2 in that the steps of forming the contact holes 12 for electrically connecting the transparent electrodes 13 for driving a liquid crystal layer to the pixel electrodes 10 and of forming the transparent electrodes 13 for driving a liquid crystal layer are omitted. In Embodiment 2, the pixel electrodes 10 and the color filter 11 having conductive characteristics function as electrodes for substantially driving a liquid crystal layer.

Formation of a Color Filter

In the case where the color filter 11 is electrochemically formed on the pixel electrodes 10 on the active matrix substrate a and is used as; a part of an electrode for driving a liquid crystal layer, in order to apply a sufficient effective voltage to the liquid crystal layer, the specific resistance of the color filter is required to be 1.2×10⁶ Ω·cm or less in a 12-inch diagonal XGA liquid crystal display apparatus. In a 6-inch diagonal VGA liquid crystal display apparatus, the specific resistance is required to be 1.2×10⁷ Ω·cm or less.

Furthermore, in the case where the color filter 11 is electrochemically formed, a supporting electrolyte is added to a solution (electrolytic solution), in which a coloring matter is dispersed, so as to increase a current value when the color filter 11 is formed, whereby the resistance of the solution is decreased.

However, in the case where the specific resistance of the color filter is applied as described above, and the resistance of the electrolytic: solution is decreased, it becomes difficult to produce a color filter with a uniform thickness, due to a variation in the ON resistance of active elements (resistance of elements when a voltage is applied to the gate electrodes and a voltage equal to or smaller than that to the gate electrodes is applied to the source electrodes.

Hereinafter, the relationship between the specific resistance of a color filter, the resistance of an electrolytic solution as a coloring solution, and the thickness of the color filter will be described.

Production of a Conductive Color Filter

It is assumed that transparent conductive particles with the surfaces thereof being treated so as to be hydrophobic are contained in a conductive color filter in an amount of about 5% by volume to about 50% by volume based on the total volume of the color filter. It was confirmed that when such transparent conductive particles are contained in the color filter in an amount of about 50% by volume or less, the specific resistance of the color filter is decreased to become about 10⁻¹ Ω·cm or less. On the other hand, when such transparent conductive particles are contained in the color filter in an amount of about 5% by volume or more, the specific resistance of colored layers becomes about 1.2×10⁷ Ω·cm or less in the case of a 6-inch diagonal screen, for example. Therefore, a sufficient charge ratio can be obtained from TFTs of a VGA display.

The transparent conductive particles are treated so as to be hydrophobic by introducing a silane coupling agent (3-glycidoxypropyltrimethoxysilane) into the surfaces of ITO particles (particle substrate). It was confirmed that due to this treatment, a contact angle (2θ) of the transparent conductive particles with respect to water became about 15° to about 138°, and the hydrophobicity of the transparent conductive particles substantially improved compared with that of ITO particles (contact angle: about 0° to about 1°) which had not been treated so as to be hydrophobic.

Herein, the contact angle (2θ) with respect to water refers to the angle obtained by molding transparent conductive particles into a tablet with a diameter of about 1 cm and a thickness of about 0.1 mm by applying a pressure of about 200 kg/cm$^2$ and dropping a water droplet onto the surface of the tablet.

The color filter 11 in the present embodiment is formed by an electrolysis micelle method as described later and contains two components (i.e., a pigment and transparent conductive particles). Thus, unlike a color filter formed of a coating solution (color resin) in which a pigment is dispersed in a binder, the omission of the binder makes it possible to reduce the thickness of the color filter. The thickness of the color filter is preferably about 0.6 μm to about 3.0 μm. When the thickness is smaller than about 0.6 μm, sufficient color characteristics cannot be obtained. When the thickness is larger than about 3.0 μm, the light blocking property of the color filter increases, resulting in low light transparency of the color filter.

Furthermore, it is preferable that each adjacent pixel forming the color filter 11 has a difference in thickness of about 0.2 μm or less. For example, a thickness of each pixel is preferably in a range of about 0.8 μm to about 1.4 μm for red pixels, about 0.7 μm to about 1.3 μm for green pixels, and about 0.6 μm to about 1.2 μm for blue pixels.

The upper limit of the thickness of the color filter is set mainly so as to prevent an increase in a specific resistance of the color filter, and the lower limit thereof is determined by the color characteristics of the color filter. When the thickness of each pixel exceeds the upper limit, the transparent conductive particles absorb visible light (in particular, light with a wavelength of about 500 nm or less), so that the light transparency decreases. It is confirmed that particularly, when the thickness of blue pixels using a phthalocyanine pigment exceeds about 1.2 μm, the light transparency with respect to light having a wavelength in the vicinity of about 460 nm decreases to about 60% or less.

Next, an example of a process for producing the color filter will be described.

The above-mentioned patterned pixel electrodes 10 are subjected to micelle electrolysis using an electrolytic solution (coloring solution) for the colored layers 11R, 11G, and 11B for each color, whereby the color filter 11 is formed. During the micelle electrolysis, a voltage is selectively applied to a source line of each color while applying a voltage to a gate line, whereby the colored layers 11R, 11G, and 11B of each color are formed. The electrolysis conditions are as follows. An electrolysis voltage is about 0.5 volts (vs, SCE), and an electrolysis time is about 20 minutes for a red electrolytic solution, about 10 minutes for a green electrolytic solution, and about 7 minutes for a blue electrolytic solution. The above-mentioned electrolytic solution is obtained by mixing an organic pigment and hydrophobic ITO particles with a medium (pure water) containing a surfactant and an electrolyte which have redox reactivity and dispersing the organic pigment and the ITO particles by an ultrasonic homogenizer to obtain a micelle colloid dispersant. The composition of the electrolytic solution is shown below in detail.

Composition of the Electrolytic Solution

| | |
|---|---|
| (1) Red electrolytic solution | |
| Organic pigment {mixture of anthraquinone type (red):azo type (yellow) pigment = 9:1) | 6 g/liter |
| Hydrophobic ITO particles | 3.6 g/liter |
| Surfactant Ferrocenyl PEG (produced by Dojin Kagaku) | 2.2 g/liter |
| Supporting electrolyte LiBr | 4 g/liter |
| (2) Green electrolytic solution | |
| Organic pigment {mixture of phthalocyanine green type (green):azo type (yellow) pigment = 8:2} | 10 g/liter |
| Hydrophobic ITO particles | 6 g/liter |
| Surfactant Ferrocenyl PEG (produced by Dojin Kagaku) | 2.2 g/liter |
| Supporting electrolyte LiBr | 4 g/liter |
| (3) Blue electrolyte | |
| Organic pigment {mixture of phthalocyanine type (blue): dioxane violet type (purple) pigment = 9:1} | 7 g/liter |
| Hydrophobic ITO particles | 4.2 g/liter |
| Surfactant Ferrocenyl PEG (produced by Dojin Kagaku) | 2.2 g/liter |
| Supporting electrolyte LiBr | 4 g/liter |

As the hydrophobic ITO particles contained in each of the above-mentioned electrolytic solutions, ITO particles (average primary particle diameter: about 300 to about 400 Å; produced by Sumitomo Metal Mining Co., Ltd.) whose surfaces are treated so as to be hydrophobic are used. The ITO particles are treated so as to be hydrophobic as follows. Five grams of ITO particles are collected in a round bottom flask with a capacity of about 200 ml. Then, 100 g of a toluene solution containing about 5% by weight of 3-glycidoxypropyltrimethoxysilane was added to the ITO particles. The mixture is refluxed at about 120° C. for about 20 hours and subjected to a coupling treatment.

After the completion of electrolysis using an electrolytic solution of each color, the resultant substrate is casually washed with water, and sintered at about 18° C. for about 30 minutes.

The color filter having the colored layers 11R, 11G, and 11B thus obtained has a thickness of about 0.8 μm for red, about 0.7 μm for green, and about 0.6 μm for blue. The specific resistance of each colored layer is found to be about $10^6$ Ω·cm for red, about $10^5$ Ω·cm for green, and about $10^5$ Ω·cm for blue. In the present embodiment, the color filter is formed by using the micelle electrolysis method. However, the color filter may be formed by another electrochemical method.

Next, a black matrix layer for covering gaps between each colored layer is formed by known ordinary photolithography. Thereafter, the alignment films 15 are formed on the surfaces of the color filter 11 and the black matrix layer, respectively. The alignment film 15 is formed, for example, by spin-coating a polyimide resin to a thickness of about 400 Å and heating the polyimide resin at about 250° C. for one hour. The alignment films 15 are subjected to a rubbing treatment by an ordinary method. Here, the black matrix layer may be formed before the color filter 11 is formed.

Evaluation of a Color Filter

The relationship between the resistance ($R_{den}$) of each electrolytic solution and the specific resistance (ρ) of the color filter is measured by varying the concentration of the electrolyte shown in the above-mentioned production method to change the resistance of the electrolytic solution (colored solution) and by varying the content of the conductive particles to change the specific resistance of the color filter.

Figure 8:
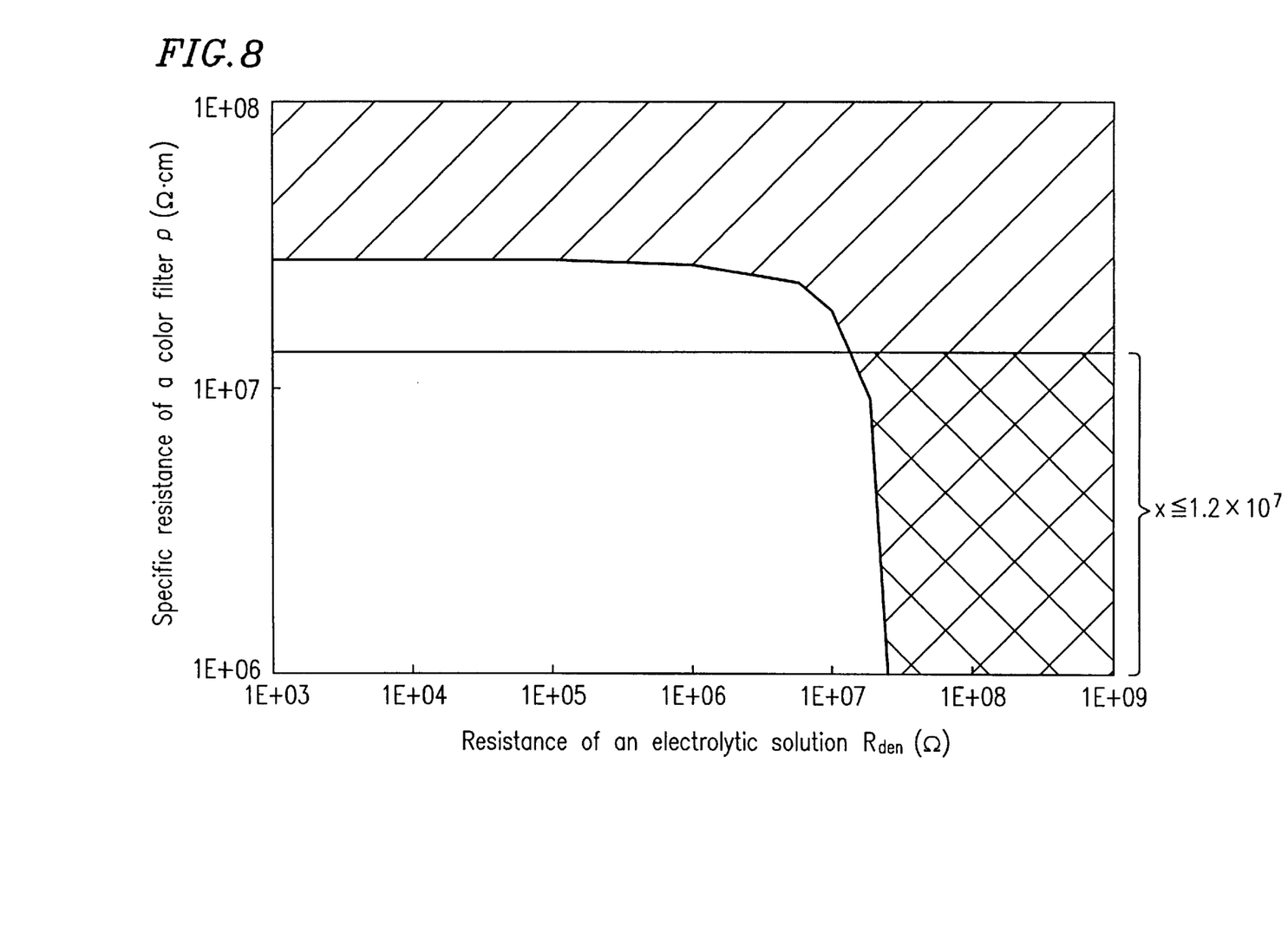
FIG. 8 is a graph showing the relationship between the specific resistance of a color filter and the resistance of an electrolytic solution in an active matrix substrate used in a 6-inch diagonal VGA liquid crystal display apparatus according to Embodiment 2 of the present invention.

FIG. 8 shows conditions of the resistance of an electrolytic solution and the specific resistance of a color filter, which allow the thickness of a color filter to be uniform, in the case where a color filter is formed on pixel electrodes on an active matrix substrate used in a 15 cm-(about 6 inches) diagonal VGA liquid crystal display apparatus (e.g., 640× RGB×480 pixels; dot clock: about 25.2 MHz) by an electrochemical reaction. The shaded region is determined by the following Expression (4).

$$\frac{\int_0^{t_s} \frac{1}{\left\{g_l(t)\rho \times \frac{10^{-4}}{1.21 \times 10^{-4}} + 2.07 \times 10^7 + R_{den}\right\}} dt}{\int_0^{t_s} \frac{1}{\left\{g_s(t)\rho \times \frac{10^{-4}}{1.21 \times 10^{-4}} + 1.1 \times 10^7 + R_{den}\right\}} dt} \geq 0.8 \quad (4)$$

In order to use a color filter as a part of an electrode for driving a liquid crystal layer, the specific resistance of the color filter is required to be about $1.2 \times 10^7$ Ω·cm or less in the case of a 6-inch diagonal screen. Therefore, in order to produce a color filter with a uniform thickness in the case where a color filter produced by an electrochemical reaction on the pixel electrodes is used as a driving electrode, the resistance of an electrolyte is desirably about $2.8 \times 10^7$ Ω or more, as is understood from FIG. 8.

However, as described in Embodiment 1, depending upon the kind of a liquid crystal display apparatus, a liquid crystal display apparatus of high display quality can be produced even when the resistance of an electrolytic solution is less that about $2.8 \times 10^7$ Ω.

Figure 9:
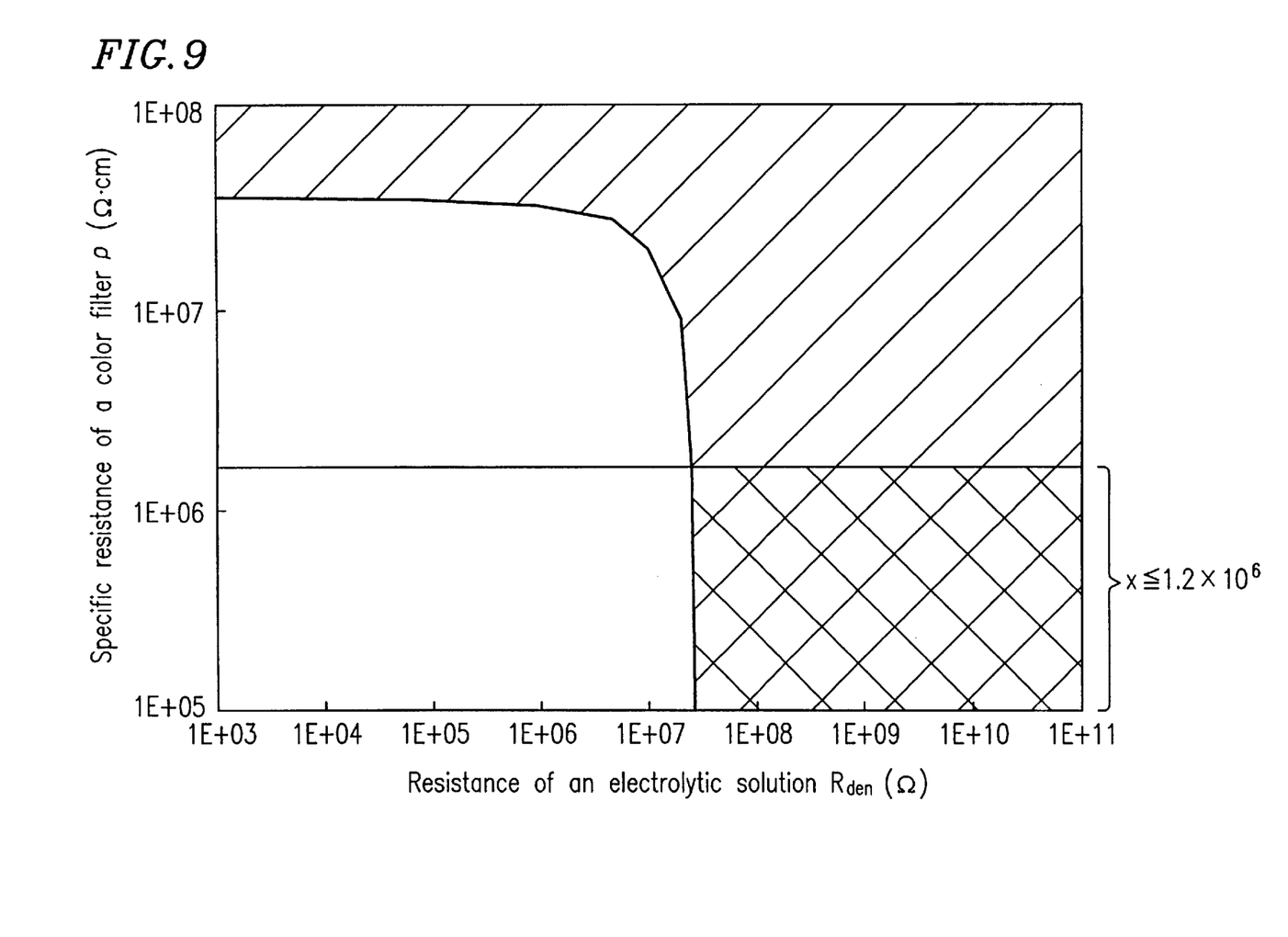
FIG. 9 is a graph showing the relationship between the specific resistance of a color filter and the resistance of an electrolytic solution in an active matrix substrate used in a 12-inch diagonal XGA liquid crystal display apparatus according to Embodiment 2 of the present invention.

Alternatively, for example, FIG. 9 shows conditions of the resistance of an electrolytic solution and the specific resistance of a color filter which allow the thickness of a color filter to be uniform, in the case where a color filter is formed on pixel electrodes on an active matrix substrate used in a 30 cm-(about 12 inches) diagonal XGA liquid crystal display apparatus (e.g., 1024×RGB×768 pixels; dot clock: about 65 MHz) by electrodeposition. The shaded region is determined by the following Expression (5).

$$\frac{\int_0^{t_s} \frac{1}{\left\{g_l(t)\rho \times \frac{10^{-4}}{1.92 \times 10^{-4}} + 1.48 \times 10^7 + R_{den}\right\}} dt}{\int_0^{t_s} \frac{1}{\left\{g_s(t)\rho \times \frac{10^{-4}}{1.92 \times 10^{-4}} + 0.70 \times 10^7 + R_{den}\right\}} dt} \geq 0.8 \quad (5)$$

In order to use a color filter as a part of an electrode for driving a liquid crystal layer, the specific resistance of the color filter is required to be about $1.2 \times 10^6$ Ω·cm or less. Therefore, in order to produce a color filter with a uniform thickness in the case where a color filter produced by an electrochemical reaction on the pixel electrodes is used as a driving electrode, the resistance of an electrolyte is desirably about $2.4 \times 10^7$ Ω or more as is understood from FIG. 9.

However, as described in Embodiment 1, depending upon the kind of a liquid crystal display apparatus, a liquid crystal display apparatus of high display quality can be produced even when the resistance of an electrolytic solution is less than about $2.4 \times 10^7$ Ω.

Figure 10:
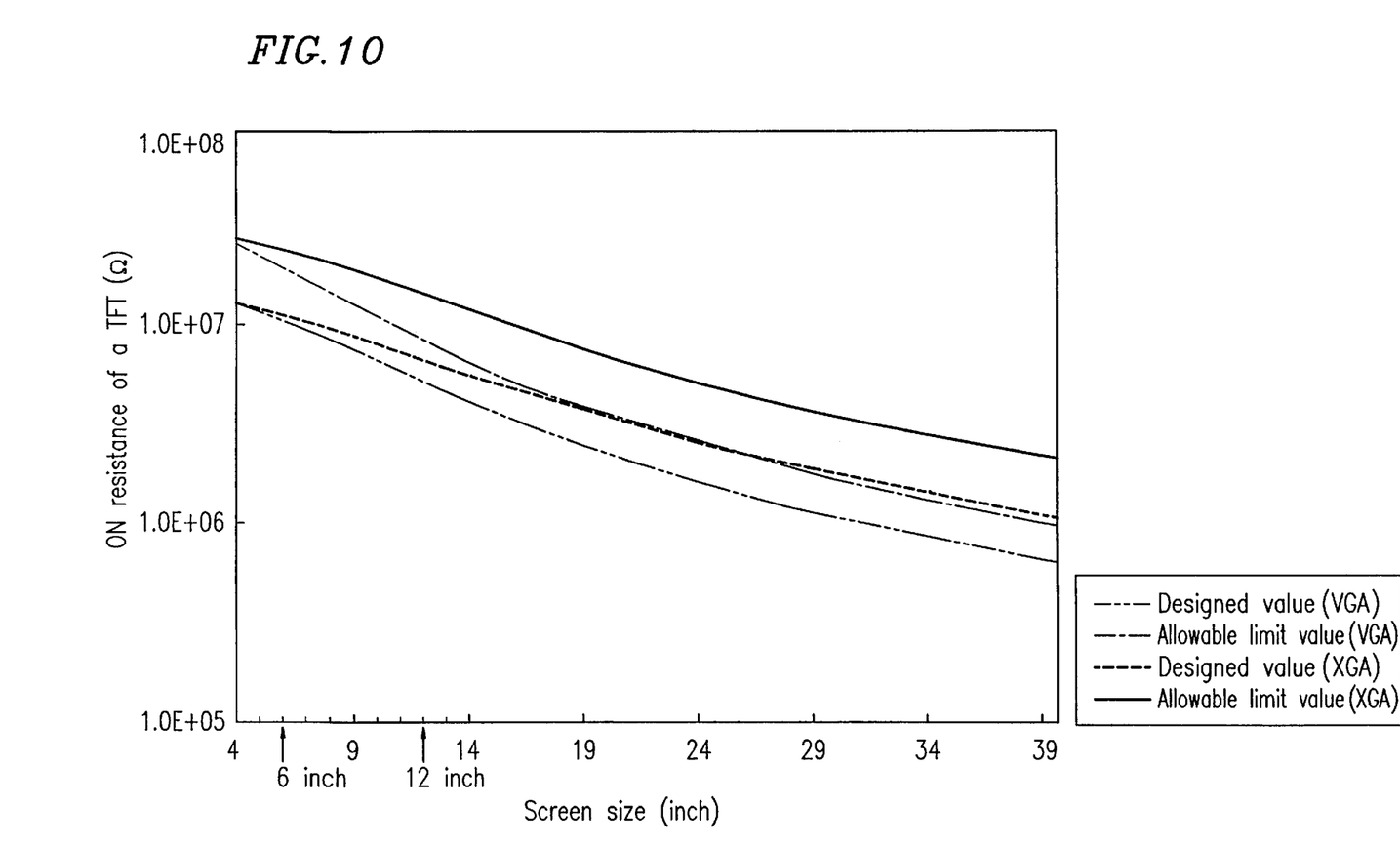
FIG. 10 is a graph showing the relationship between changes in a screen size of a liquid crystal display apparatus and the ON resistance of a TFT.

FIG. 10 is a graph showing the relationship between the screen size of a liquid crystal display apparatus and the ON resistance of a TFT. The abscissa represents a screen size (inch), and the ordinate represents the ON resistance (Ω) of a TFT. In FIG. 10, a designed value of a VGA display is represented by a two-dot dash line, an allowable limit value is represented by one-dot dash line, a designed value of an XGA display is represented by a broken line, and an allowable limit value of an XGA display is represented by a solid line.

In FIG. 10, when the ON resistance of a TFT exceeds the allowable limit value, a liquid crystal layer is not sufficiently charged, so that point defects occur. Thus, the ON resistance of a TFT corresponding to a screen size is obtained from FIG. 10, and the ON resistance is substituted into the corresponding parameters in the above-mentioned Expressions (1) to (3), whereby the specific resistance of a color filter (colored layers) and the resistance of a coloring solution during production can be calculated.

As described above, according to the present invention, the specific resistance of colored layers of a color filter, and the resistance of a coloring solution per pixel between a counter electrode for forming a color filter and an active matrix substrate while the colored layers are electrochemically formed are obtained based on theoretically determined expressions. The colored layers of the color filter are formed so as to satisfy these resistances. Therefore, even in the presence of a variation in the ON resistance of active elements, an active matrix substrate having a color filter, which enables display quality to be enhanced, can be provided.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An active matrix substrate, comprising:

active elements;

lines for supplying a signal to the active elements;

electrodes electrically connected to the active elements; and a color filter made of a plurality of colored layers, which are provided on an insulating substrate, wherein the colored layers are formed in such a manner that a specific resistance ρ thereof and a resistance $R_{den}$ of a coloring solution while the colored layers are electrochemically formed per pixel between a counter electrode for forming the color filter and the active matrix substrate satisfy the following expression:

$$g_l(t_s)/g_s(t_s) \geq D_{lCF}/D_{CF}$$

where $D^{lCF}$ represents an allowable lower limit value (μm) of a thickness of the color filter, $g_s(t_s)$ and $D_{CF}$ represent $$D_{CF} = g_s(t_s) = k \times \int_0^{t_s} V / \{g_s(t)\rho \times 10^{-4}/S + R_{on}(s) + R_{den}\} dt$$

where $D_{CF}$: designed thickness (μm) of a color filter, $R_{on}(s)$: designed value (Ω) of the ON resistance of an active element $t_s$: time (seconds) for which a color filter with a thickness $D_{CF}$ is formed on a pixel electrode connected to an active element with a designed value $R_{on}(s)$ V: DC power source (volts)

$g_s(t)$: thickness ($\mu$m) of a color filter formed on a pixel electrode connected to an active element with a designed value $R_{on}(s)$ after t seconds k: proportionality factor (ms$^{-1}$A$^{-1}$) of electrodeposition (thickness of a color filter becomes g $\mu$m when the color filter is electro-deposited for T seconds at a constant current a $\mu$A)

$\rho$: specific resistance ($\Omega$·cm) of a color filter formed by electrodeposition S: area (cm$^2$) of a pixel electrode $R_{den}$: resistance ($\Omega$) of a coloring solution per pixel between a counter electrode for forming a color filter and an active matrix substrate, and $g_l(t_s)$ represents $$g_l(t_s) = k \times \int_0^{t_s} V / \{g_l(t)\rho \times 10^{-4}/S + R_{on}(l) + R_{den}\} dt$$

where $R_{on}(l)$: allowable limit value ($\Omega$) of a variation in the ON resistance of active elements $g_l(t)$: thickness ($\mu$m) of a color filter formed on a pixel electrode connected to an active element having an ON resistance with an allowable limit value of a variation $R_{on}(l)$, and the rest of the values are as defined above.

2. An active matrix substrate according to claim 1, wherein the electrodes electrically connected to the active elements are made of pixel electrodes and transparent electrodes for driving a liquid crystal layer, and the transparent electrodes for driving a liquid crystal layer are used for driving a liquid crystal layer.

3. An active matrix substrate according to claim 1, wherein the electrodes electrically connected to the active elements are made of pixel electrodes, and the pixel electrodes and the color filter both have conductive characteristics and are used for driving a liquid crystal layer.

4. A method for producing an active matrix substrate, comprising the step of forming a color filter made of a plurality of colored layers on an insulating substrate having active elements, lines for supplying a signal to the active elements, and electrodes electrically connected to the active elements, wherein the colored layers are formed in such a manner that a specific resistance $\rho$ thereof and a resistance $R_{den}$ of a coloring solution while the colored layers are electrochemically formed per pixel between a counter electrode for forming the color filter and the active matrix substrate satisfy the following expression:

$$g_l(t_s)/g_s(t_s) \geq D_{lCF}/D_{CF}$$

where $D_{lCF}$ represents an allowable lower limit value ($\mu$m) of the thickness of the color filter, $g_s(t_s)$ and $D_{CF}$ represent $$D_{CF} = g_s(t_s) = k \times \int_0^{t_s} V / \{g_s(t)\rho \times 10^{-4}/S + R_{on}(s) + R_{den}\} dt$$

where $D_{CF}$: designed thickness ($\mu$m) of a color filter, $R_{on}(s)$: designed value ($\Omega$) of the ON resistance of an active element $t_s$: time (seconds) for which a color filter with a thickness $D_{CF}$ is formed on a pixel electrode connected to an active element with a designed value $R_{on}(s)$ V: DC power source (volts)

$g_s(t)$: thickness ($\mu$m) of a color filter formed on a pixel electrode connected to an active element with a designed value $R_{on}(s)$ after t seconds k: proportionality factor (ms$^{-1}$A$^{-1}$) of electrodeposition (thickness of a color filter becomes g $\mu$m when the color filter is electro-deposited for T seconds at a constant current a $\mu$A)

$\rho$: specific resistance ($\Omega$·cm) of a color filter formed by electrodeposition S: area (cm$^2$) of a pixel electrode $R_{den}$: resistance ($\Omega$) of a coloring solution per pixel between a counter electrode for forming a color filter and an active matrix substrate, and $g_l(t_s)$ represents $$g_l(t_s) = k \times \int_0^{t_s} V / \{g_l(t)\rho \times 10^{-4}/S + R_{on}(l) + R_{den}\} dt$$

where $R_{on}(l)$: allowable limit value ($\Omega$) of a variation in the ON resistance of active elements $g_l(t)$: thickness ($\mu$m) of a color filter formed on a pixel electrode connected to an active element having an ON resistance with an allowable limit value of a variation $R_{on}(l)$, and the rest of the values are as defined as above.

5. A method for producing an active matrix substrate according to claim 4, wherein the electrodes electrically connected to the active elements are made of pixel electrodes and transparent electrodes for driving a liquid crystal layer, and the transparent electrodes for driving a liquid crystal layer are used for driving a liquid crystal layer.

6. A method for producing an active matrix substrate according to claim 4, wherein the electrodes electrically connected to the active elements are made of pixel electrodes, and the pixel electrodes and the color filter both have conductive characteristics and are used for driving a liquid crystal layer.

* * * * *